Feb. 2, 1960      C. H. TYSON      2,923,113
SEALING MECHANISM FOR EVACUATED VESSELS
Filed Jan. 29, 1957
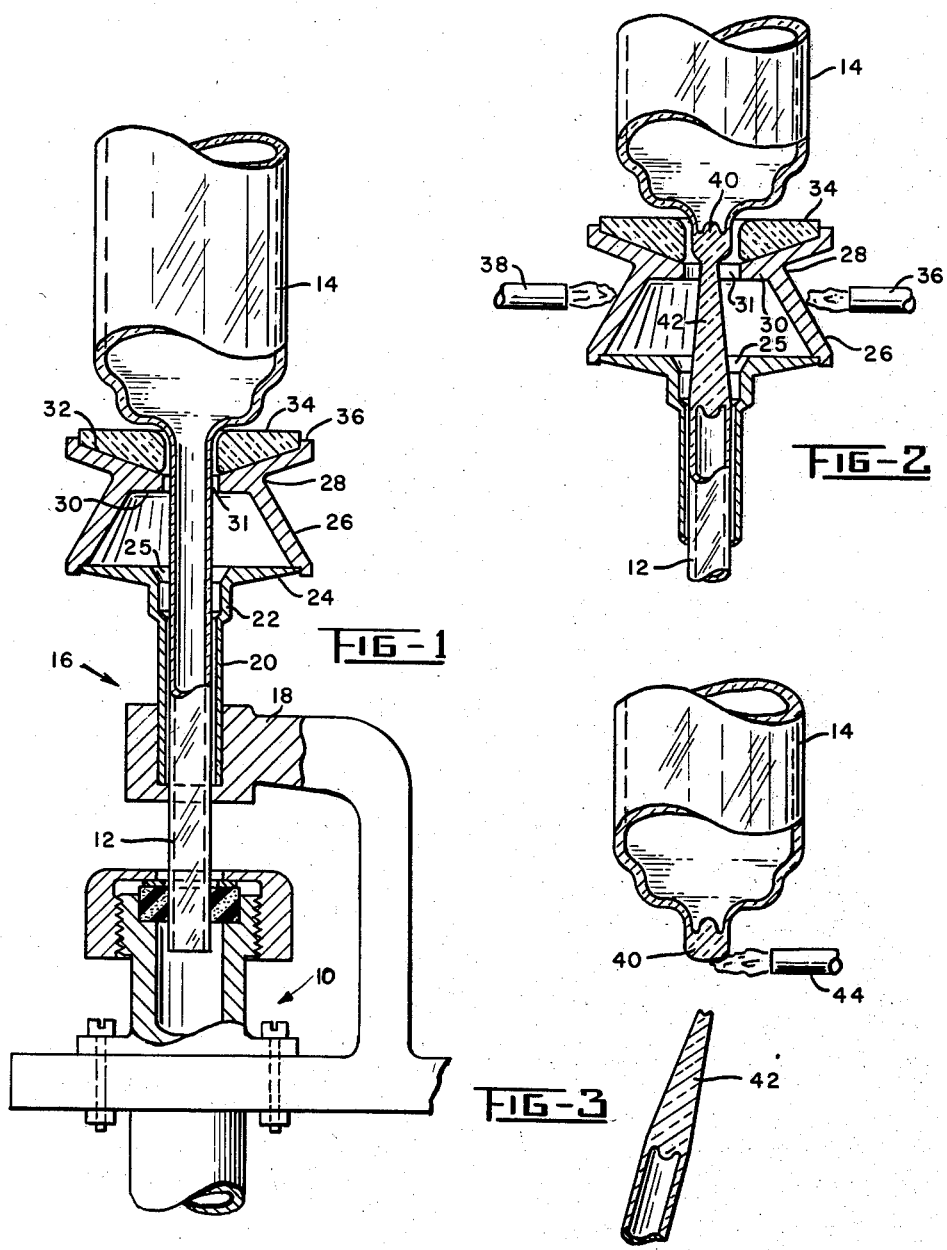
INVENTOR
CHARLES H. TYSON
BY Michael Hertz
ATTORNEY

United States Patent Office 2,923,113
Patented Feb. 2, 1960

2,923,113

SEALING MECHANISM FOR EVACUATED VESSELS

Charles H. Tyson, Hatboro, Pa., assignor, by mesne assignments, to Sylvania Electric Products, Inc., Wilmington, Del., a corporation of Delaware Application January 29, 1957, Serial No. 636,929

7 Claims. (Cl. 53—79)

The invention relates to tipping off or sealing of evacuated glass vessels and particularly to the sealing of evacuated envelopes of glass such as radio and cathode ray tubes.

Sealing of large evacuated glass chambers such as television picture tubes have been attended with difficulty and danger since the tube could implode at any time after exhaust, either before, during or after sealing. A conventional form of sealing is to heat a glass tubulation extending from the tube, as from the neck of a picture tube, while the envelope is being exhausted of air through said tubulation, this heating being accomplished with a gas torch, and to mechanically pull the tubulation apart, causing the tubulation to draw in at its narrowest part under the reduced atmospheric pressure in the envelope and thus close the bore through the tubulation. The closed section of tubulation is then further heated until the tubulation parted, forming a completed final seal. This work required the services of skilled operators.

It is an object of the invention to provide mechanism for sealing tubes which shall not require the services of skilled operators.

Hitherto, even with skilled operators, these seals were not always uniform, they at times being too thin walled or improperly annealed whereby strains were set up in the glass at the seal.

It is therefore a further object of the invention to provide an automatic sealing unit which will consistently produce a uniform and strong seal.

Other objects will become apparent upon consideration of the following specification and claims when taken in conjunction with the accompanying drawings in which, Figure 1 discloses the exhaust tubulation and adjacent envelope portion of a television tube in position in the sealing unit of the invention, ready to be sealed off, Figure 2 shows the conformation of the glass within the sealing unit toward the final stages of sealing and Figure 3 shows the final sealing step and conformation of the tip of the sealed tube.

Considering the invention in greater detail, at 10 there is shown the exhaust port structure of an evacuating machine within which, in air sealed relation, is positioned the tubulation 12 of a bulb or envelope 14, a portion of which, only, is illustrated. The tubulation extends through the sealing unit indicated generally as 16. The sealing unit comprises a support arm 18 fastened to any part to which the port structure 10 is fastened in which is seated a stainless steel sleeve 20 which is of increased internal diameter at its upper end, as indicated at 22, and which terminates in a horizontal annular circular plate 24 tapering to a thin edge at the outer periphery. This plate has an axial opening 25 for free passage of the tubulation therethrough and forms a support for a vertical stainless steel slug 26 of uniform thickness, circular in any horizontal cross section, and which tapers to a waist portion 28 whereat the slug is provided with an inwardly directed circular web or lip 30 apertured centrally, as indicated at 31, loosely receiving the tubulation but close to the outer wall of said tubulation. The slug may be fastened in any convenient fashion to the plate 24, as by brazing. The upper surface of the slug is shaped to provide a conical seat, as indicated at 32, and on this seat is placed a ceramic heat insulating annulus 34 as of alumina. This heat insulator at its bottom conforms to the shape of the conical seat and fits within the rim portion 36 of the slug. The top of the ceramic heat insulator is flat. Where the exhaust tubulation 12 is located within the exhaust port, it is best to have the bottom of the bulb close to but not in contact with the insulator 34 in order to maintain the bottom of the bulb as cool as conveniently possible.

Adapted to be shifted to positions on opposite sides of the slug 26 is a pair of burners 36 and 38 the flames from which are adapted to play on the lower sloped portion of the slug from its waist portion 28 close to the lower end of the slope. As the slug is heated, the internal walls of the slug will radiate heat toward the tubulation 12 and because of the mass of metal in the web 30, with most of the heat concentrated in the inner peripheral wall of the web and the small distance of the inner wall of the web from the tubulation, the tubulation opposite the web will soften faster than the rest of the tubulation in the slug. But by reason of the indirect method of heating of the tubulation and the slope of the walls of the slug, the whole section of tubing within and adjacent the slug is heated with such uniform gradient that strain in the glass is prevented thereby avoiding cracking of the glass in the tubulation. Instead of heat being applied externally of the slug 26, the slug obviously may be heated by an electrical heater within the metal of the slug. The object is to obtain radiated heat from the inner shaped walls of the slug in any convenient fashion. The flames 36 and 38 are applied to the slug after exhausting the bulb and while the tubulation is still under exhaust. Continued application of heat to the slug then by reason of the difference in pressure within and without the bulb, causes the walls of the tubulation to collapse. As the walls collapse, the temperature of the glass reaches the melting point so that some of the molten glass is forced into the bulb to form a gob as indicated at 40, which gob is utilized to seal off the bulb from the atmosphere. The gob, as it forms, reaches a cooler area opposite the heat insulator 34 whereat it solidifies. Also because the glass is most fluid in the opening 31 and the glass below the lip 30 has some weight, it flows down away from the lip area forming a thin line of juncture between gob and solidified tubulation opposite the lip. In actual practice, the heating is discontinued before actual separation of glass opposite the lip takes place but, if desired, heating may be continued until such actual separation of parts occurs. The gob 40 having shifted into a comparatively cool area will not melt. In either event, when the heat is cut off, as by removing the burners 36 and 38, the slug temperature gradually drops producing a prolonged annealing effect on the gob and sealed tubulation.

On completion of the sealing and annealing steps the evacuation of the air through the port 10 is stopped, and the bulb is removed from the unit. When the portion 42 is still attached to the bulb, it is cracked off in any convenient fashion, as by a lateral force applied to the tubulation, and the rough glass at the bottom of the gob is smoothed by means of a burner 44.

Having described the invention, what is claimed as new is:

1. A sealing unit for an evacuated vessel comprising an empty chamber defined by top and bottom walls and a peripheral side wall of substantially uniform thickness throughout, all of said walls being heat conductive, the top and bottom walls having axially aligned openings therein, the inner sides of the side wall of the chamber sloping downwardly and outwardly, means for heating said walls, a suction device having an exhaust port, and means for supporting the port below the chamber and for axially aligning the exhaust port with the openings in the top and bottom walls.

2. A sealing unit for an evacuated vessel comprising a hollow metallic slug of substantially uniform thickness with an intermediate restricted waist portion and a centrally perforated web within the slug at the waist portion, means outside of the hollow of the slug for heating the slug, a suction device with an exhaust port, and means for supporting the device with the port below the slug and in axial alignment with the perforation in the web.

3. A sealing unit for an evacuated vessel comprising a hollow conical truncated metallic member of substantially uniform thickness with a top of small area and a bottom of larger area, a centrally perforated wall member bridging the walls of the member at the small area, means external of the hollow of the member for heating the same, a suction device with an exhaust port, and means for supporting the device below the metallic member and with the port in axial alignment with the perforation in the wall member.

4. A sealing unit for an evacuated vessel comprising a metallic hollow truncated conical member whose conical wall is of uniform thickness and which slopes downwardly and outwardly, a top wall with a central perforation therein forming part of said member, a heat insulating member having a central perforation therein and coaxially seated on the top wall with the perforations in axial alignment, means for heating said conical member, a suction device with an exhaust port, and means for supporting the suction device below the member with the port in axial alignment with the perforation in the top wall.

5. A sealing unit for an evacuated vessel comprising a hollow truncated heat conductive cone of uniform thickness with small area top and large area bottom walls each centrally perforated, a heat insulating washer concentric with said top wall and seated on the same, means external of the hollow of the cone for heating the same, a suction device with an exhaust port, and means for supporting the suction device below the cone with its port in axial alignment with the perforations in the top and bottom walls.

6. A sealing device for evacuated vessels provided with an exhaust tube, said device comprising a support, an exhaust port on the support into which the tube is adapted to extend and sealing mechanism on the support thereabove, said sealing mechanism comprising a hollow metallic member of truncated conical form of uniform thickness bounded by upper and lower walls, with the wall of least area on top, each of the walls being centrally perforated, said support holding said sealing mechanism with the perforations in axial alignment with the exhaust port to accommodate said exhaust tube, and means external of the hollow member for heating the same.

7. A sealing device for evacuated vessels provided with an exhaust tube, said device comprising a support, an exhaust port on the support into which the tube is adapted to extend and sealing mechanism on the support thereabove, said sealing mechanism comprising a hollow metallic member of truncated conical form of uniform thickness bounded by upper and lower walls, with the wall of least area on top, each of the walls being centrally perforated, said support holding said sealing mechanism with the perforations in axial alignment with the exhaust port to accommodate said exhaust tube, a heat insulating washer mounted on said top wall in concentric relation thereto, and means external of the hollow member for heating the same.

References Cited in the file of this patent

UNITED STATES PATENTS

| | | |
|---|---|---|
| 1,647,644 | Madden et al. | Nov. 1, 1927 |
| 2,273,441 | Gustin | Feb. 17, 1942 |
| 2,321,224 | Madden et al. | June 8, 1943 |
| 2,367,451 | West | Jan. 16, 1945 |
| 2,423,111 | Pfleghar | July 1, 1947 |
| 2,484,688 | Cowley | Oct. 11, 1949 |

FOREIGN PATENTS

| | | |
|---|---|---|
| 733,683 | Great Britain | July 20, 1955 |